US006609684B2

(12) United States Patent
Van Scoy et al.

(10) Patent No.: US 6,609,684 B2
(45) Date of Patent: Aug. 26, 2003

(54) FLEXIBLE SNAP-TOGETHER CABLE TROUGH

(75) Inventors: John T. Van Scoy, Shakopee, MN (US); Alex Watts, Minnetonka, MN (US); Wayne Giesen, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/910,419

(22) Filed: Jul. 20, 2001

(65) Prior Publication Data

US 2003/0015627 A1 Jan. 23, 2003

(51) Int. Cl.⁷ .................................................. F16L 3/00
(52) U.S. Cl. .......................................... 248/49; 59/78.1
(58) Field of Search ........................ 248/49, 68.1, 51; 59/78.1, 900; 174/68.3, 69, 135

(56) References Cited

U.S. PATENT DOCUMENTS

| 689,894 A | 12/1901 | Ltz |
| 2,805,401 A | 9/1957 | Crowley |
| 2,975,805 A | 3/1961 | Horn |
| 3,042,351 A | * 7/1962 | Du Bois ................ 248/49 |
| 3,053,358 A | * 9/1962 | Gross .................... 248/49 |
| 3,592,239 A | 7/1971 | Adler .................. 138/155 |
| 4,130,463 A | 12/1978 | Klavir ................. 202/263 |
| 4,392,344 A | * 7/1983 | Gordon ................ 59/78.1 |
| 4,480,859 A | 11/1984 | Rueckl et al. ........ 285/163 |
| 4,570,437 A | 2/1986 | Moritz ................ 59/78.1 |
| 4,652,017 A | 3/1987 | Drechsel .............. 285/5 |
| 4,658,577 A | 4/1987 | Klein ................. 59/78.1 |
| 4,781,401 A | 11/1988 | Sharp ................. 285/44 |
| 5,067,678 A | 11/1991 | Henneberger et al. .. 248/68.1 |
| 5,160,811 A | 11/1992 | Ritzmann ............ 174/68.3 |
| 5,161,580 A | 11/1992 | Klug ................... 138/92 |

(List continued on next page.)

FOREIGN PATENT DOCUMENTS

GB         612162      11/1948

OTHER PUBLICATIONS

ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995.
ADC Telecommunications brochure entitled "Fiber Guide™ Fiber Management System," 6 pages, dated Jun., 1989.
ADC Telecommunications brochure entitled "ADC Fiber-Guide® System Express Exit™ 2+2," 2 pages, dated May 1999.
ADC Telecommunications brochure entitled "FiberGuide® Fiber Management System," 37 pages, dated Jun., 1999.
ADC Telecommunications brochure entitled "FiberGuide® Fiber Management Systems," 54 pages, dated Sep. 2000.

*Primary Examiner*—Gwendolyn Baxter
(74) *Attorney, Agent, or Firm*—Merchant & Gould, P.C.

(57) ABSTRACT

An adjustable cable management trough member and assembly. The assembly including first and second trough members having sidewalls extending from a base to define a U-shaped trough for receiving at least one telecommunications cable. The first trough member having a male end which is received by a female end of the second trough member. The trough members include slide posts and retention slots which engage each other to allow the trough members to be angled relative to each other in a first direction. The trough members also include a guide member and a guide slot which engage each other to allow the trough members to be angled relative to each other in a second direction. The first and second trough members may be identical.

20 Claims, 12 Drawing Sheets

U.S. PATENT DOCUMENTS

| | | | |
|---|---|---|---|
| 5,215,338 A | 6/1993 | Kimura et al. | 285/166 |
| 5,240,209 A | 8/1993 | Kutsch | 248/49 |
| 5,271,585 A | 12/1993 | Zetena, Jr. | 248/49 |
| 5,276,596 A | 1/1994 | Krenzel | 362/191 |
| 5,316,243 A | 5/1994 | Henneberger | 248/68.1 |
| 5,316,244 A | 5/1994 | Zetena, Jr. | 248/49 |
| 5,335,349 A | 8/1994 | Kutsch et al. | 455/6.1 |
| 5,375,891 A | 12/1994 | Sicotte et al. | 285/176 |
| 5,409,266 A | 4/1995 | Baker | 285/44 |
| 5,503,354 A | 4/1996 | Lohf et al. | 248/58 |
| 5,638,672 A * | 6/1997 | Furukawa | 59/78.1 |
| 5,752,781 A | 5/1998 | Haataja et al. | 403/387 |
| 5,923,753 A | 7/1999 | Haataja et al. | 379/438 |
| 5,937,131 A | 8/1999 | Haataja et al. | 385/136 |
| 5,995,699 A | 11/1999 | Vargas et al. | 385/134 |
| 6,037,538 A | 3/2000 | Brooks | 174/48 |
| 6,076,779 A | 6/2000 | Johnson | 248/49 |
| 6,156,974 A | 12/2000 | Blase | 174/68.3 |
| 6,170,249 B1 | 1/2001 | Blase et al. | 59/78.1 |
| 6,173,560 B1 * | 1/2001 | Weber | 59/78.1 |
| 6,174,231 B1 | 1/2001 | Bodin | 454/184 |
| 6,433,282 B1 * | 8/2002 | Traversa | 174/95 |
| 6,463,728 B1 * | 10/2002 | Daoud | 59/78.1 |

\* cited by examiner

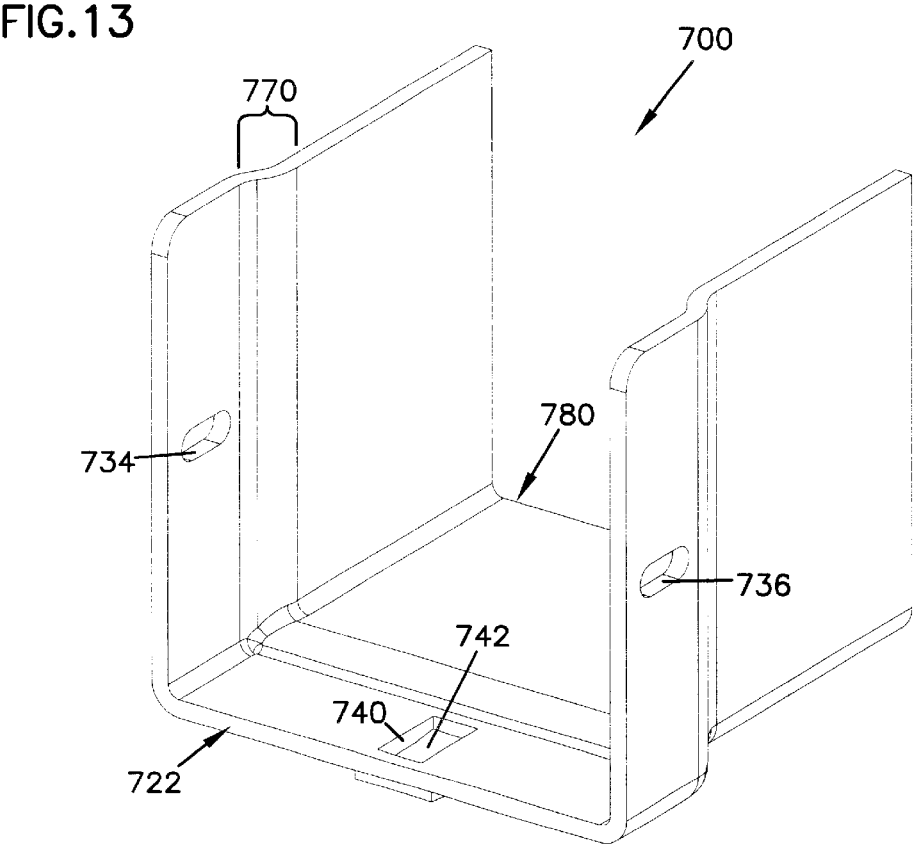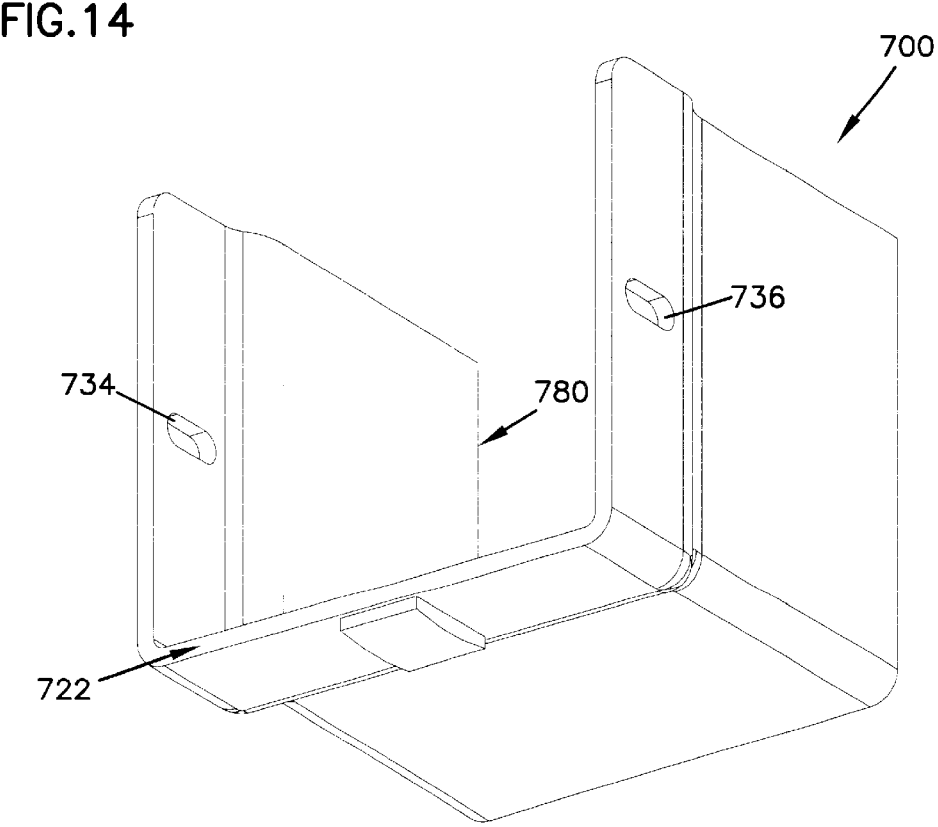

FLEXIBLE SNAP-TOGETHER CABLE TROUGH

FIELD OF THE INVENTION

This invention pertains to a system for the management and routing of cables, such as telecommunications cables. More particularly, this invention pertains to flexible trough assemblies for cable management systems.

BACKGROUND OF THE INVENTION

In the telecommunications industry, the use of optical fibers for signal transmission is accelerating. With the increased utilization of optical fiber systems, optical fiber cable management requires industry attention. Similar issues exist with other telecommunications cables such as copper-based cables.

One area of telecommunications cable management that is necessary is the routing of cables from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another. Accordingly, such routing systems often include a plurality of trough members, fittings and couplings for routing the cables. U.S. Pat. Nos. 5,067,678; 5,316,243; and 5,752,781 show various cable routing systems.

When routing cables, it is desirable that the routing system will be easy to install. For example, providing a continuous cable path throughout the system can be a challenge, such as when obstacles or misalignments arise during installation of the system. There is a need for devices which make system installation easier and less reliant on precisely aligned components.

U.S. Pat. No. 6,076,779 to Johnson discloses an apparatus for linking misaligned cable troughs. The Johnson device uses a number of different materials other than the preferred plastic. There is a need for an improved, simplified, cost effective system for making adjustments in the alignment of cable management troughs and pathways.

SUMMARY OF THE INVENTION

The present invention relates to an adjustable cable management trough member and assembly. The assembly may include first and second trough members. Each trough member has sidewalls extending from a base to define a U-shaped trough for receiving at least one telecommunications cable. The first trough member has a male end, and the second trough member has a female end which receives the male end of the first trough member. The trough members include slide posts and retention slots which engage each other to allow the trough members to be angled relative to each other in a first direction. The trough members also include a guide member and a guide slot which engage each other to allow the trough members to be angled relative to each other in a second direction. The first and second trough members may be identical.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

FIG. 13 is a first perspective view of a female adapter trough member according to the present invention.

FIG. 14 is second perspective view of the trough member of FIG. 13.

Figure 1:
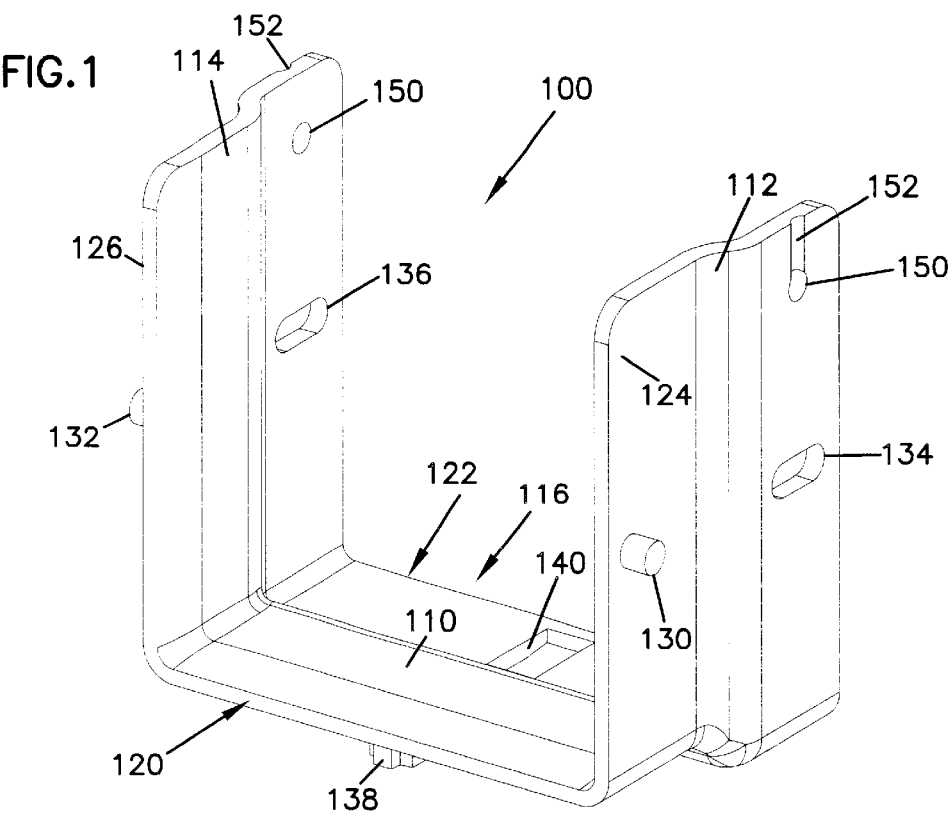
FIG. 1 is a first perspective view of a cable management trough member according to the principles of the present invention.

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE PREFERRED EMBODIMENT

In the following detailed description, references are made to the accompanying drawings that depict various embodiments in which the invention may be practiced. It is to be understood that other embodiments may be utilized, and structural and functional changes may be made without departing from the scope of the present invention.

Figure 2:
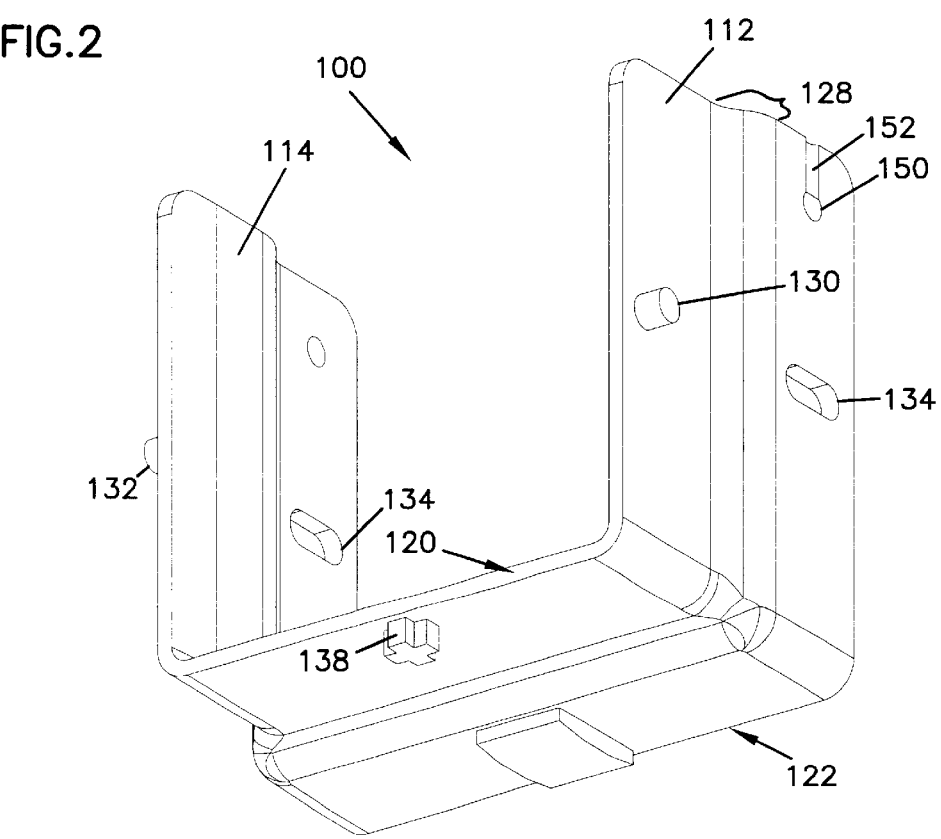
FIG. 2 is a second perspective view of the trough member of FIG. 1.

Referring now to FIGS. 1 and 2, the figures show a trough member 100 constructed according to the present invention. The trough member includes a base 110 from which sidewalls 112 and 114 extend. The base 110 and sidewalls 112 and 114 define a generally U-shaped trough section having a trough interior which defines a cable pathway 116 for guiding telecommunications cables.

Trough member 100 has two ends, a male end 120 and a female end 122. The male end 120 is sized to be received longitudinally in the female end of an identical trough section. That is, the outsides 124 and 126 of the sidewalls 112 and 114 are separated by a distance which is smaller than the distance which separates the insides of the sidewalls 112 and 114 at the female end 122. The trough member 100 includes a transition portion 128 in which the sidewalls 112 and 114 transition from the male end dimensions to the female end dimensions.

The troughs may include a plurality of projections and mating pockets for receiving the projections. For example, in the embodiment of the FIGS., male end 120 includes slide posts 130 and 132 which extend from the outside surfaces 124 and 126 of sidewalls 112 and 114. The slide posts 130 and 132 are located about midway up the height of the sidewalls 112 and 114. At the female end 122 of trough member 100, sidewalls 112 and 114 define retention slots 134 and 136. Retention slots 134 and 136 are sized to receive slide posts from a linked trough member. The retention slots 134 and 136 are sized to allow the slide posts of a linked trough member to be adjustably positioned within the slots.

Trough member 100 includes a guide member 138 extending from a bottom side of the base at the male end 120. Trough member 100 also defines a guide groove 140 in the base 110 at the female end 122 for receiving the guide member 138. The guide member 138 may be adjustably positioned within the guide groove 140.

Trough member 100 may be snap fit with identical trough members to form longer cable troughs. Trough members are preferably constructed of plastic so that the slide posts may be easily fitted into the retention slots. FIGS. 3–10 illustrate a plurality of identical trough members 100 snap-fitted together to form longer cable troughs. In each embodiment, the male end of the trough members are received by the female end of an adjacent trough member. The slide posts are received in the retention slots of the adjacent trough member, and the guide member is received by the guide groove of the adjacent trough member.

Figure 3:
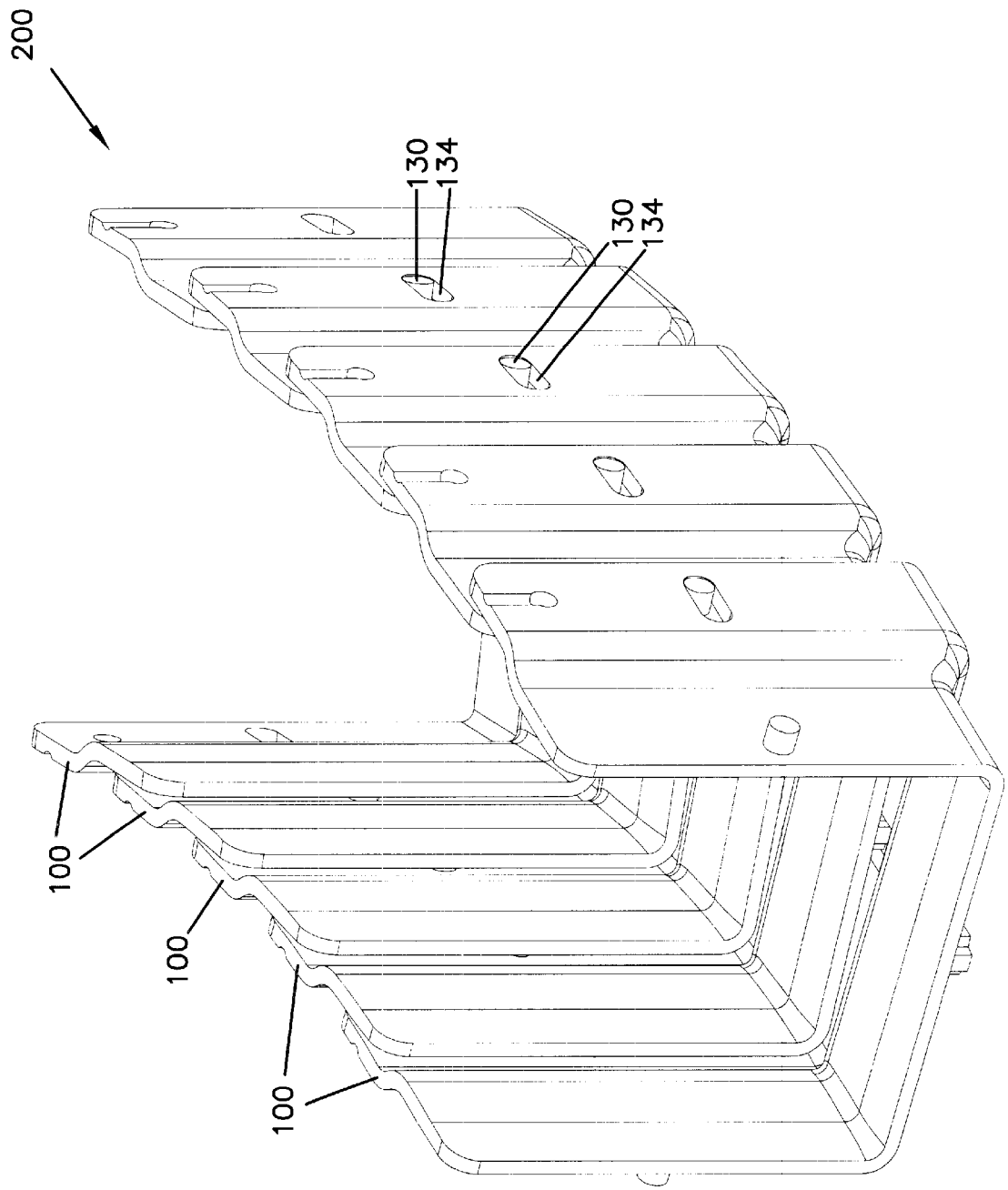
FIG. 3 is a perspective view of a cable trough assembly comprising a plurality of identical trough members linked and angled toward a sidewall of the assembly.
Figure 4:
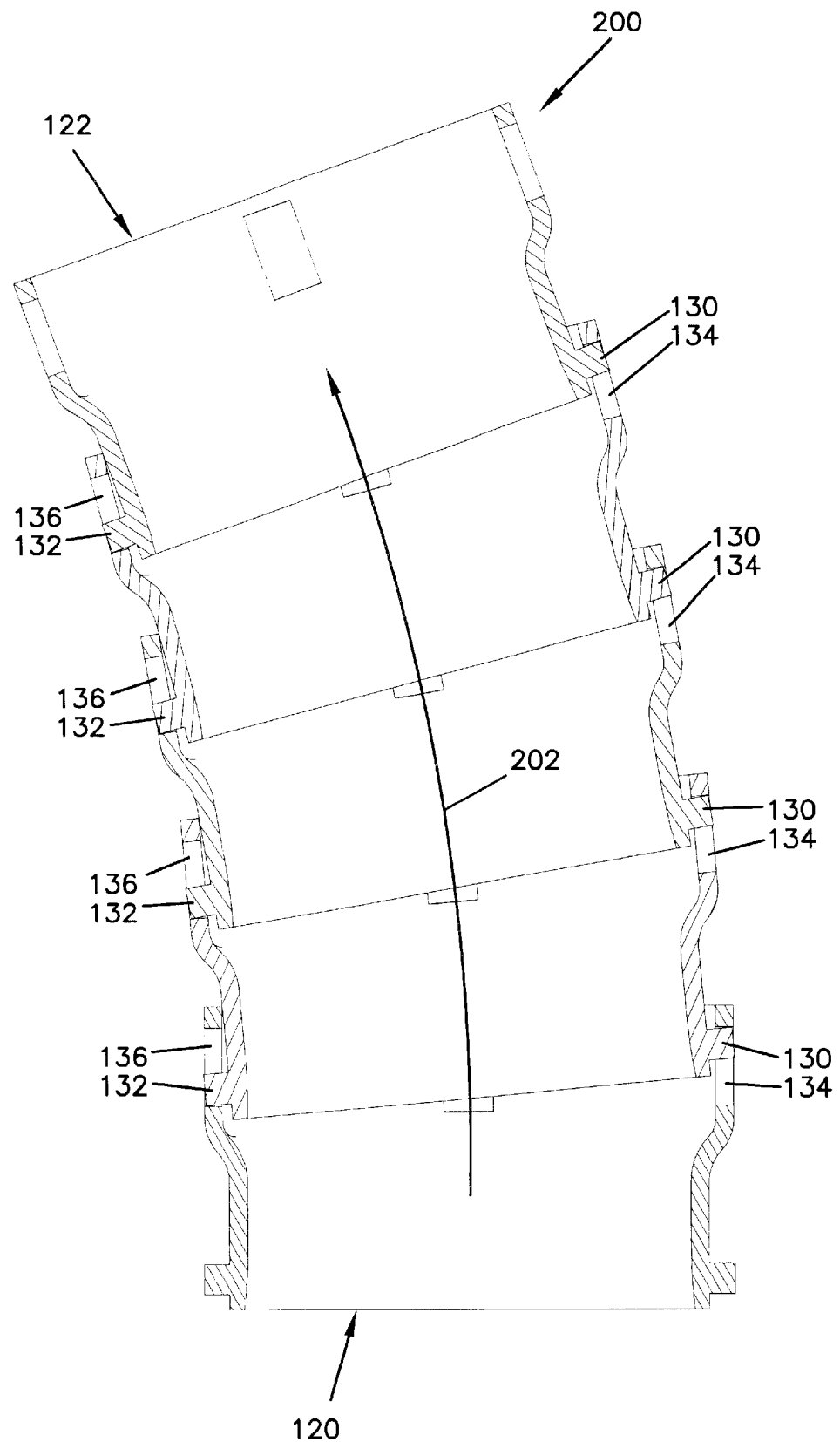
FIG. 4 is a cross-sectional view from the top of the assembly of FIG. 3.

Referring now to FIGS. 3 and 4, a plurality of identical trough members 100 are linked to form a curving cable trough 200 defining a combined cable pathway 202. The trough 200 is curved by positioning the right side slide posts 130 toward the female end of retention slots 134, and the left hand slide posts 132 toward the male end of slots 136 (best seen on FIG. 4). In this way each additional trough member added to the trough 200 angles the combined cable pathway 202 about 5 degrees to the left.

Figure 5:
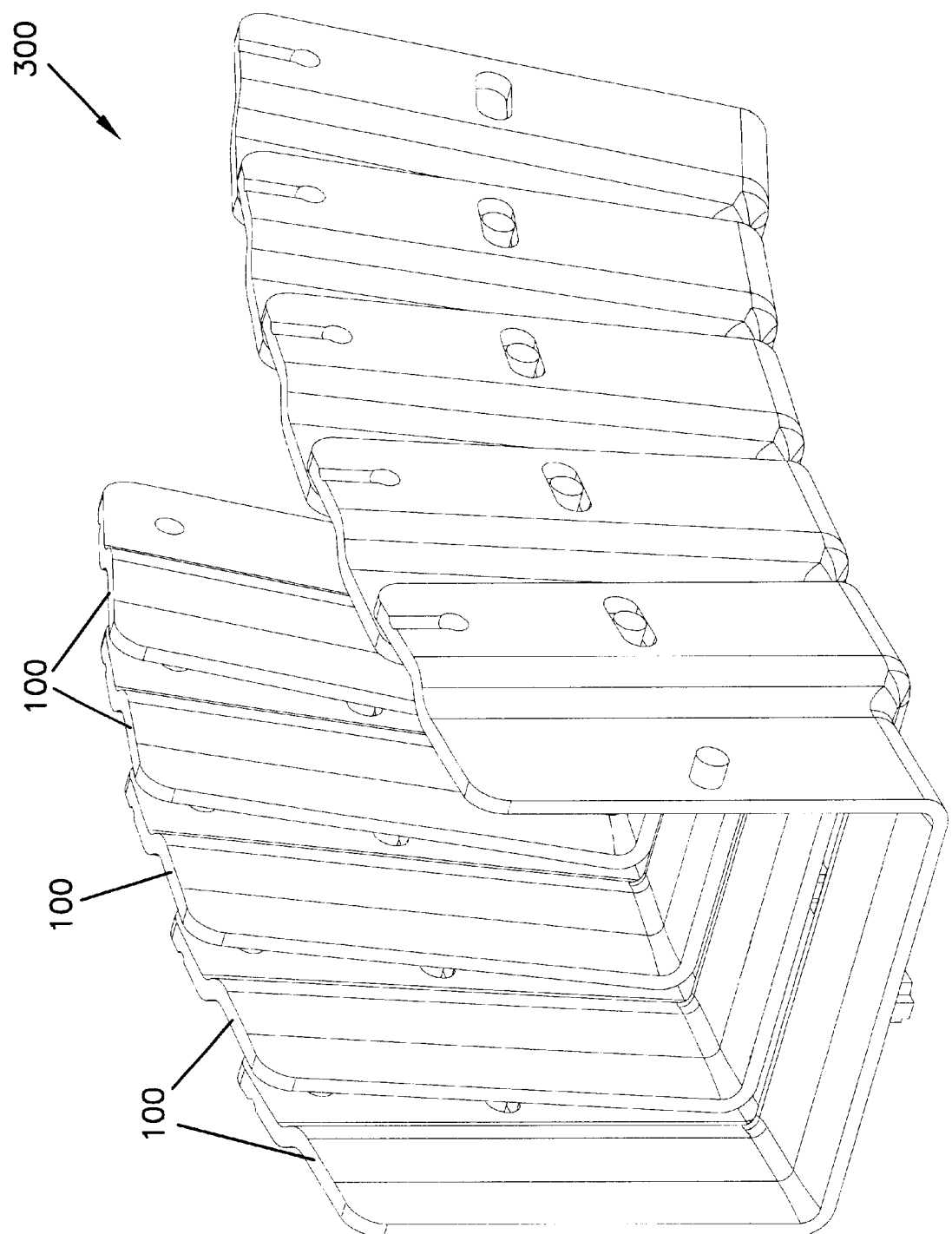
FIG. 5 is a perspective view of the same assembly of FIG. 3, only downwardly angled and not angled toward a sidewall.
Figure 6:
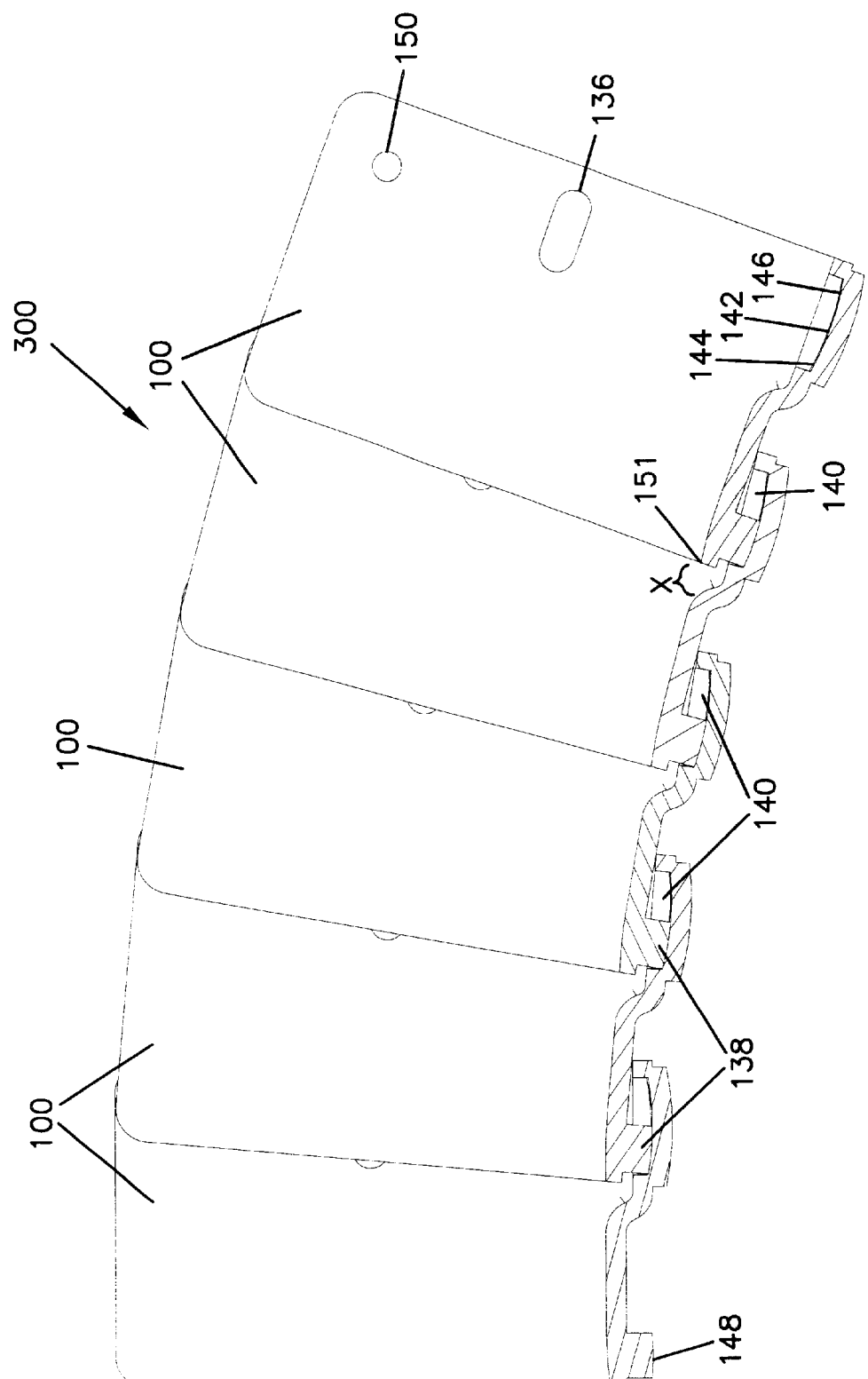
FIG. 6 is a side cross-sectional view of the assembly of FIG. 5.

Referring now to FIGS. 5 and 6, a plurality of identical trough members 100 are linked to form an downwardly angled cable trough 300. The trough 300 is angled by positioning the guide members 138 in the guide grooves 140. The guide grooves 140 include a curved wall 142. A first portion 144 of curved wall 142 is set at a downward angle relative to the base 110 of the trough member 100. A second portion 146 of curved wall 142 is set at an upward angle relative to the base 110 of the trough member 100. Guide member 138 includes a curved end 148 that corresponds to the curved wall 142 of the guide groove 140. By positioning the guide member 138 along either the upwardly or downwardly angled portions of curved wall 142, the trough members may be made to angle the cable pathway of the assembly up or down, i.e. in a direction perpendicular to the base 110 of the trough members. The guide members 138 of trough 300 in FIGS. 5 and 6 are positioned along the downwardly angled portion 144 of the curved wall 142, thereby causing the trough 300 to angle 5 degrees downward for each additional trough member added.

Figure 7:
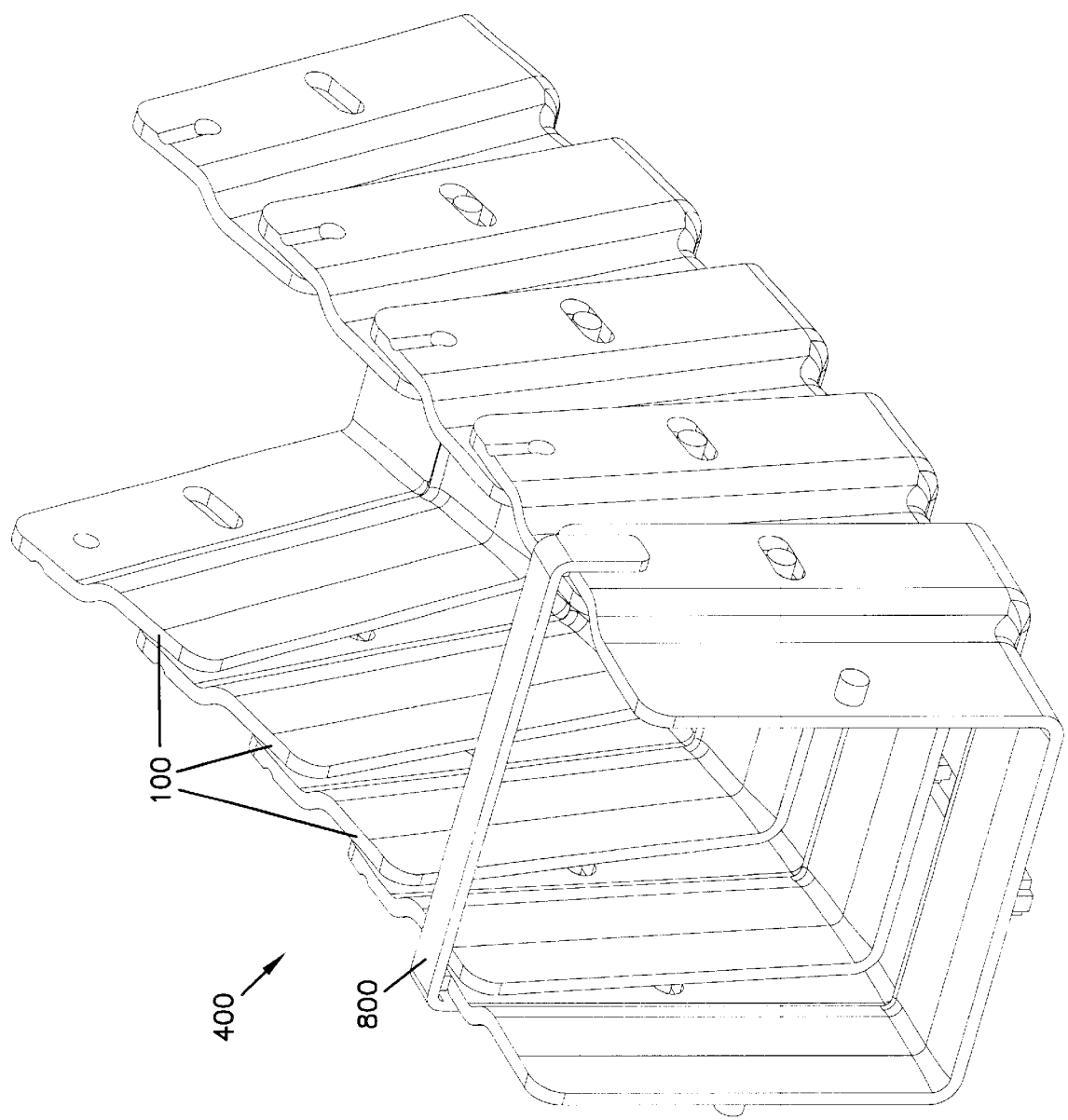
FIG. 7 is a perspective view of the same assembly of FIG. 3, only upwardly angled and with a strap added for retaining cables inside the assembly.
Figure 8:
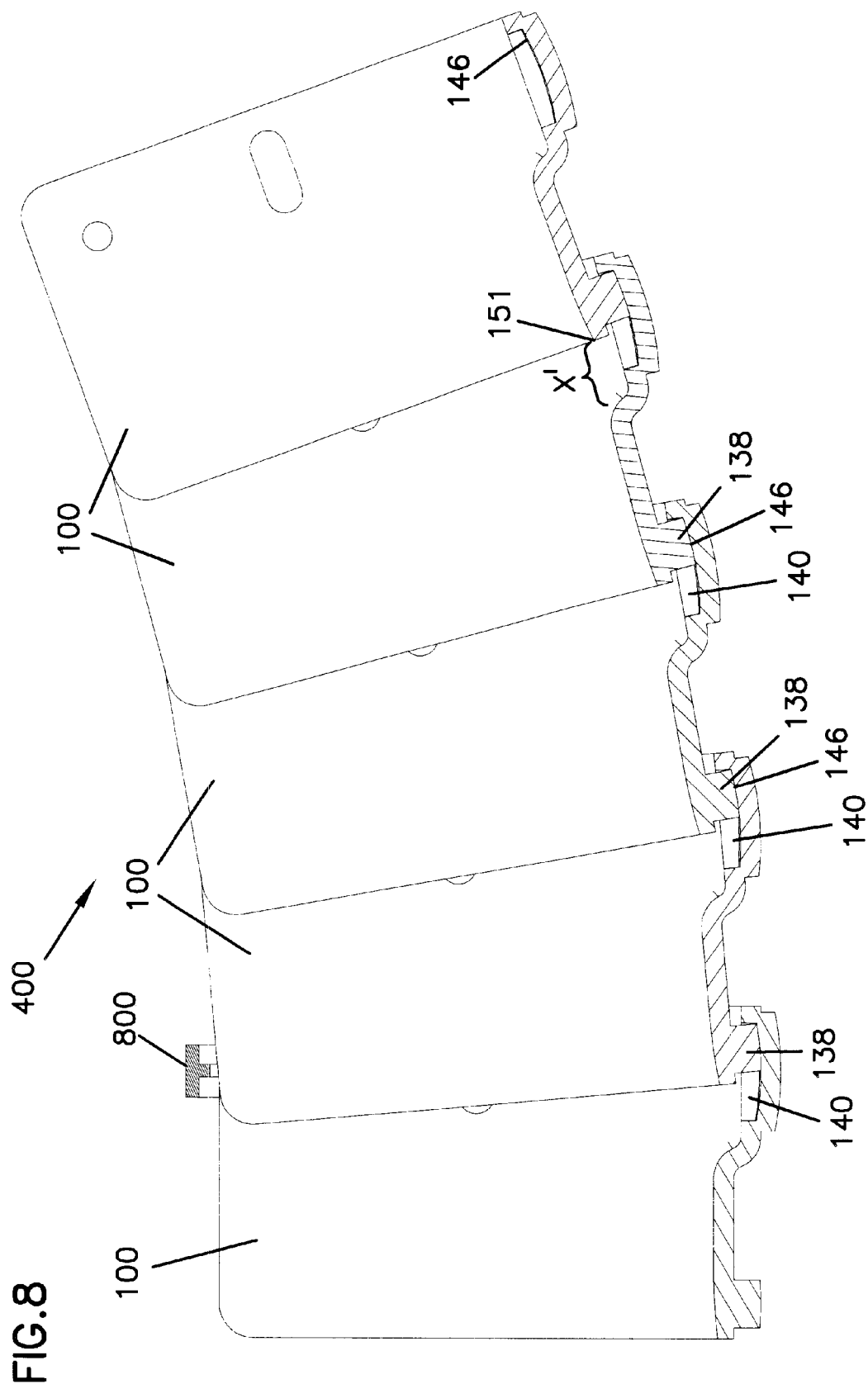
FIG. 8 is a side cross-sectional view of the assembly of FIG. 7.

Referring now to FIGS. 7 and 8, a plurality of identical trough members 100 are linked to form an upwardly angled cable trough 400. Guide members 138 are positioned toward the female end of guide grooves 140 adjacent the upwardly angled portions 146 of curved wall 142. Each trough member 100 is positioned to angle the cable pathway upwards about 5 degrees.

The angle of 5 degrees between two adjacent trough members 100 has been chosen to reduce the risk of damage to cables in the troughs members 100. Selecting a maximum angle between adjacent trough members at 5 degrees reduces the risk of damage to cables caused by edge 151 projecting into the cable pathway in the preferred embodiment. Furthermore, a large gap between the cable members 100 can increase the risk of damage to the cables. By selecting the maximum angle at 5 degrees, the gap (x and x' in FIGS. 6 and 8) between trough members is limited, thereby helping to prevent damage to the cables passing over the gap. In other embodiments, angles other than 5 degrees may be selected to protect the cables from damage due to edges projecting into the cable pathway or gaps between trough members.

Figure 9:
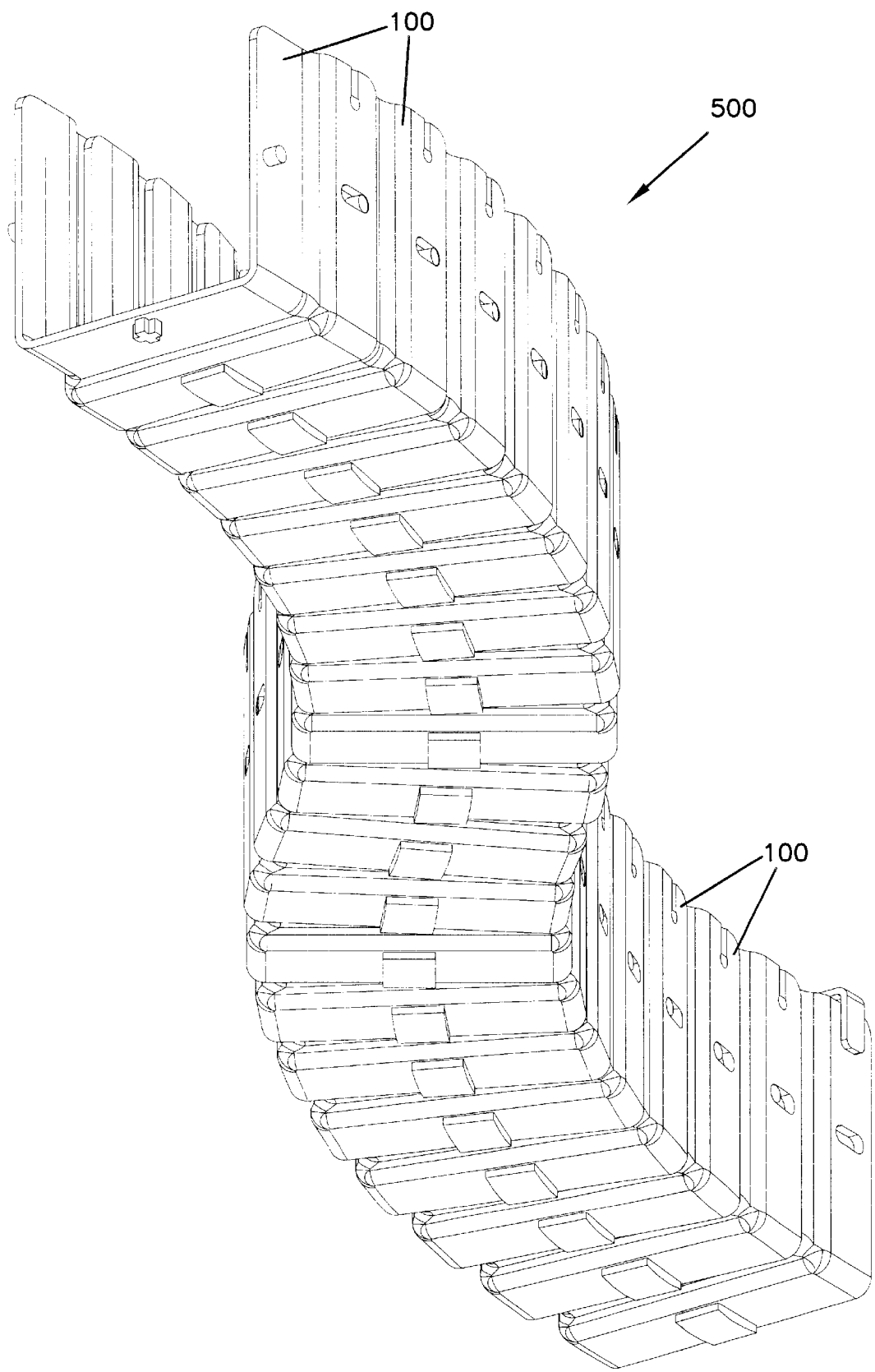
FIG. 9 is a first perspective view of a cable trough assembly according to the present invention.
Figure 10:
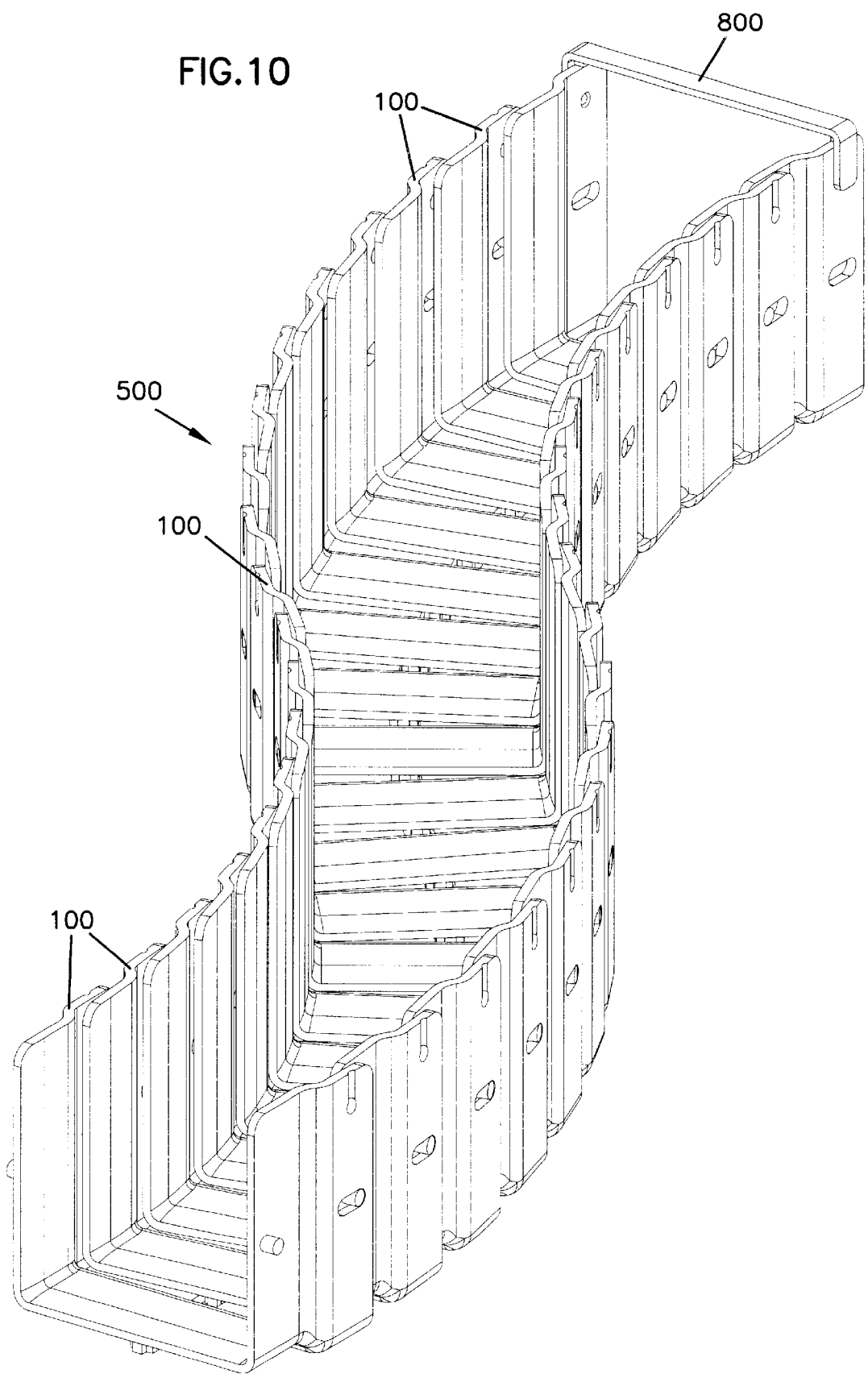
FIG. 10 is a second perspective view of the cable trough assembly of FIG. 9.

FIGS. 9 and 10 show how many trough members 100 can be combined produce a complex cable trough 500 defining a curvilinear cable pathway. In this way, misaligned cable troughs can be easily coupled. Furthermore, the trough members 100 are very versatile in that the same trough member 100 may be used to angle the cable trough left, right, up or down. This ability eliminates the need to manufacture and stock several different parts for accomplishing each of these functions. The same trough members 100 can also angle the cable trough both right and down, or both right and up. That is, the cable trough members can angle the cable pathway simultaneously in to orthogonal directions. The first direction being parallel to the base 110 (right, left), and the second direction being perpendicular to the base (up, down).

Cable troughs 200, 300, 400, and 500 can be used to link horizontal troughs and other pathways, or vertical troughs or pathways, such as to link horizontal sections with distribution or splicing racks and panels. The troughs in accordance with the present invention can be assembled on-site to the desired length. This helps the installer by avoiding precise measurement of troughing dimensions. The installer can order or stock a number of trough members 100 separately or in kits and then assemble them together to define the desired length of trough. Further, because of the flexibility of the trough to define a variety of angles and shapes, the installer can conveniently link cable pathways without having to premeasure the offset or misalignment.

Figure 11:
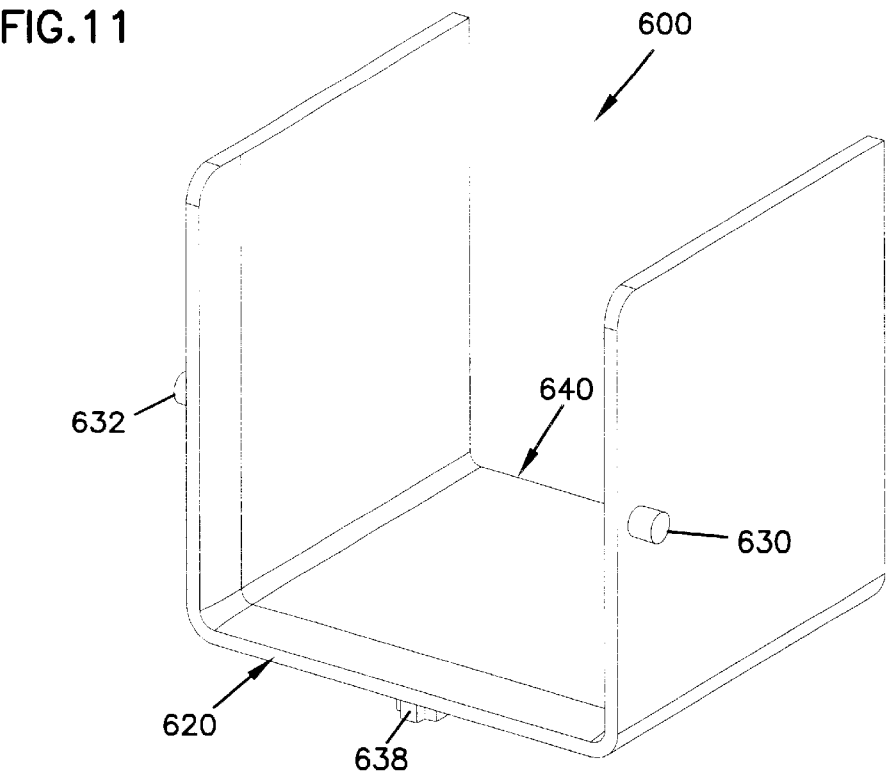
FIG. 11 is a first perspective view of a male adapter trough member according to the present invention.
Figure 12:
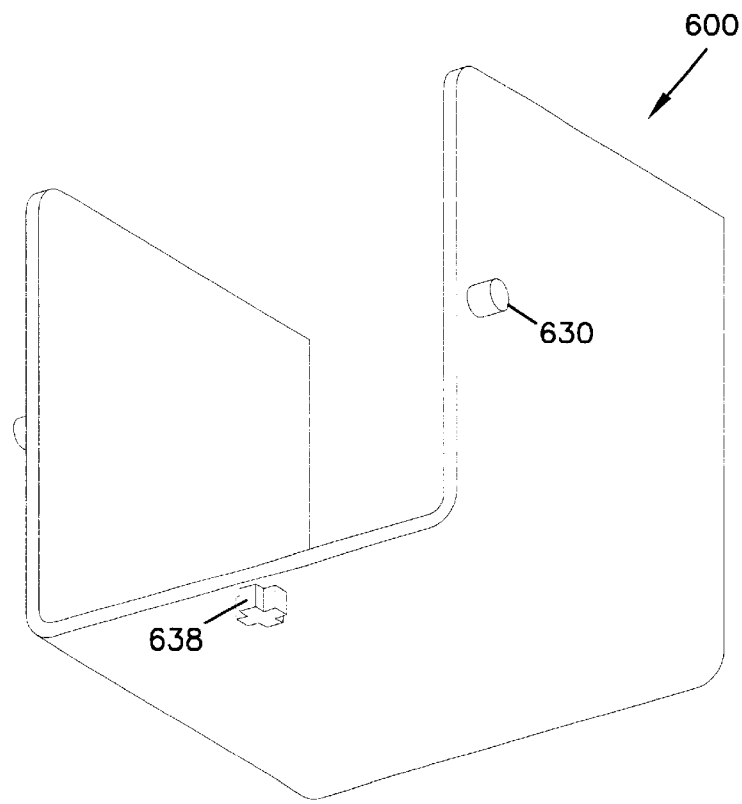
FIG. 12 is a second perspective view of the trough member of FIG. 11.

FIGS. 11 and 12 show a male coupling trough member 600. The male coupling 600 includes a male end 620 like the male end 120 of trough member 100. The male end 620 includes slide posts 630 and 632 as well as guide member 638. Opposite the male end 620 is blank end 640. Blank end 640 is provided to be coupled to an end of a cable management trough system by any of various couplers know in the art.

FIGS. 13 and 14 show a female coupling trough member 700. The female coupling 700 includes a female end 722 like the female end 122 of trough member 100. The female end 722 defines retention slots 736 and 734 and a guide groove 740 with a curved wall 742. The female end 722 transitions to a blank end 780 via transition portion 770. Blank end 780 is provided to be coupled to an end of a cable management trough system by any of various couplers know in the art.

Figure 15:
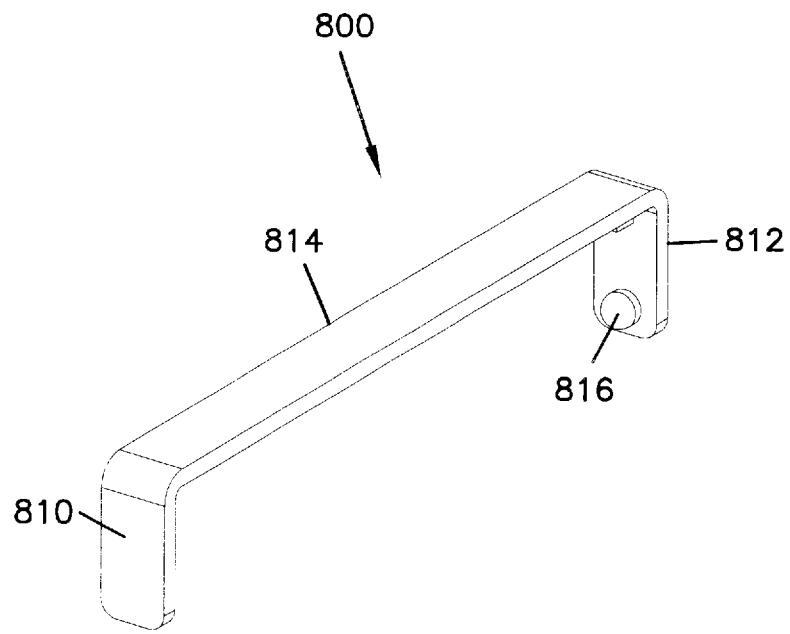
FIG. 15 is a first perspective view of a trough strap according to the present invention.
Figure 16:
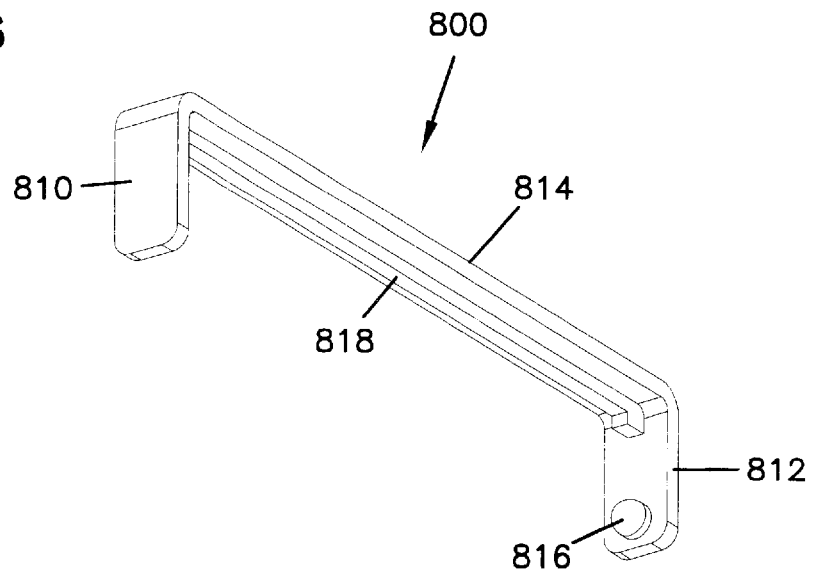
FIG. 16 is a second perspective view of the trough strap of FIG. 15.

FIGS. 15 and 16 depict a snap-on strap 800. Strap 800 includes two opposed arms 810 and 812 connected by a middle portion 814. The strap 800 is sized to span the distance between sidewalls 112 and 114 of trough member 100. The strap includes positioning posts 816 on the inside of each arm 810 and 812. An alignment rail 818 extends along one side of middle portion between arms 810 and 812. Positioning posts 816 and alignment rail 818 are received in corresponding apertures 150 and notches 152 defined by sidewalls 112 and 114 of trough members 100. Straps 800 may be used to retain cables inside trough members 100 and to secure the cables at all times. The snap-on, snap-off feature is convenient when cables need to be added or removed from the trough system. With the use of straps 800, trough members 100 may even be used to form a vertical cable trough.

With regard to the foregoing description, it is to be understood that changes may be made in detail without departing from the scope of the present invention. It is intended that the specification and depicted aspects of the invention may be considered exemplary, only, with a true scope and spirit of the invention being indicated by the broad meaning of the following claims.

What is claimed is:

1. An adjustable cable management trough assembly comprising:
    a first trough member having two sidewalls extending from a base defining a generally U-shaped trough defining a first cable pathway for receiving at least one telecommunications cable, the first trough member having a male end;
    a second trough member having two sidewalls extending from a base defining a generally U-shaped trough defining a second cable pathway for receiving at least one telecommunications cable, the second trough member having a female end, the male end of the first trough member received in the female end of the second trough member so that the first cable pathway communicates with the second cable pathway forming a combined cable pathway;
    wherein the sidewalls of one of the male end of the first trough member and the female end of the second trough member include slide posts and wherein the sidewalls of the other of the male end of the first trough member and the female end of the second trough member define corresponding retention slots which receive the slide posts, the retention slots being sized to allow the slide posts to be adjustably positioned within the retention slots, wherein the first trough member can be positioned at an angle relative to the second trough member in a first direction by adjusting the positioning of the slide posts in the retention slots; and
    wherein the base of one of the male end of the first trough member and the female end of the second trough member includes a guide member and wherein the base of the other of the male end of the first trough member and the female end of the second trough member defines a guide groove which receives the guide member, the guide groove being sized to allow the guide member to be adjustably positioned within the guide groove, wherein the first trough member can be positioned at an angle relative to the second trough member in a second direction which is orthogonal to the first direction by adjusting the positioning of the guide member within the guide groove; whereby the combined cable pathway can be simultaneously or selectively angled in two orthogonal directions.

2. The cable management trough assembly of claim 1 wherein the first trough member includes a female end opposite the male end, the female end of the first trough member being like the female end of the second trough member such that the female end of the first trough member can receive a male end of a third trough member.

3. The cable management trough assembly of claim 1 wherein the guide groove includes a curved wall having a first portion angled upwardly relative to the base and a second portion angled downwardly relative to the base.

4. The cable management trough assembly of claim 1 wherein the guide member extends from the base of the first trough member, and wherein the guide member has a rounded distal end.

5. The cable management trough assembly of claim 1 wherein the slide posts extend outwardly from the sidewalls of male end of the first trough member.

6. The cable management trough assembly of claim 1 wherein the first trough member can be angled relative to the second trough member a maximum of five degrees.

7. The cable management trough assembly of claim 1 wherein the sidewalls of the first trough member include notches shaped to accept a snap-on retention strap; and wherein the assembly includes a retention strap having a contoured surface which fits within the notches of the sidewalls to enclose the cable pathway.

8. The cable management trough assembly of claim 1 wherein the second trough member is identical to the first trough member.

9. A linkable cable management trough member comprising:
    two sidewalls extending from a base defining a generally U-shaped trough for receiving at least one telecommunications cable, the trough having a first end and a second end;
    wherein the first end includes slide posts extending outwardly from outside surfaces of the sidewalls, the first end also including a guide member extending from the base, the outside surfaces of the sidewalls at the first end being separated by a first distance;
    wherein the second end is sized to receive a trough end having sidewalls separated by a distance equal to the first distance, the sidewalls at the second end defining retention slots, the base at the second end defining a guide groove; wherein the cable management trough member can be adjustably linked to an identical cable management trough member.

10. The cable management trough member of claim 9 wherein when linked to said identical trough member the resulting link would be capable of being angled in two orthogonal directions.

11. The cable management trough member of claim 9 wherein the guide groove includes a curved surface and the guide member includes a curved surface corresponding to the curved surface of the guide groove.

12. A kit including a plurality of cable management trough members according to claim 9, wherein a selected number of cable management trough members are linkable together by receiving the first end of each trough member in the second end of an adjacent trough member, with the slide posts of one trough member received in the retention slots of the adjacent trough member, and with the guide member of the one trough member received in the guide groove of the adjacent trough member.

13. The kit of claim 12, further comprising a male coupling trough member having first and second ends, the first end including slide posts extending outwardly from opposed walls, the first end also including a guide member extending from a base, the kit further comprising a female coupling trough member having first and second ends, the first end sized to receive said male coupling trough member, the first end defining retention slots and said guide groove for receiving slide posts and said guide member of said male coupling trough member.

14. The kit of claim 12 wherein sidewalls of the cable management trough members define notches, and further comprising a strap having corresponding positioning posts for mating with the notches of the sidewalls, the straps sized to extend from sidewall to sidewall.

15. An adjustable cable management trough assembly comprising:

a first trough member having two sidewalls extending from a base defining a generally U-shaped trough defining a first cable pathway for receiving at least one telecommunications cable, the first trough member having a male end;

a second trough member having two sidewalls extending from a base defining a generally U-shaped trough defining a second cable pathway for receiving at least one telecommunications cable, the second trough member having a female end, the male end of the first trough member received in the female end of the second trough member so that the first cable pathway communicates with the second cable pathway forming a combined cable pathway;

projections extending from the male end of the first trough member;

pockets defined by the female end of the second trough member, the pockets sized larger than the projections, wherein each projection is slideably received in one of the pockets, wherein the first trough member can be positioned at a selectable angle relative to the second trough member, the angle being selectable in a first translation plane and a second translation plane, the first translation plane being perpendicular to the second translation plane.

16. The adjustable cable management trough assembly of claim 15 wherein at least two projections extend outwardly from the sidewalls of the first trough member.

17. The adjustable cable management trough assembly of claim 15 wherein at least one projection extends from the base of the first trough member.

18. The adjustable cable management trough assembly of claim 15 further comprising snap-on straps which extend from sidewall to sidewall on one of the first and second trough members.

19. A method of assembling a cable management trough comprising the steps of:

providing a first U-shaped cable trough having a male end, the male end including projections;

providing a second U-shaped cable trough having a female end, the female end defining pockets sized to receive the projections of the first trough;

snapping together the first cable trough to the second cable trough by inserting the male end into the female end so that the projections are inserted into the pockets; and moving the troughs to a desired angled position relative to each other, the angled position being selectable from positions located along a first translation plane and a second perpendicular translation plane.

20. The method of claim 19 further comprising the step of snapping on a strap between sidewalls of one of the first and second troughs.

* * * * *